(12) United States Patent
Scheufler et al.

(10) Patent No.: US 11,705,025 B2
(45) Date of Patent: Jul. 18, 2023

(54) SYSTEMS AND METHODS FOR DETERMINING A VISUAL APPEARANCE QUALITY OF AN EXTERIOR SIGNAGE AREA OF A VEHICLE

(71) Applicant: Ford Global Technologies, LLC, Dearborn, MI (US)

(72) Inventors: Nicholas Scheufler, Flat Rock, MI (US); Michael Robertson, Jr., Garden City, MI (US); Ashwin Arunmozhi, Canton, MI (US); Segundo Baldovino, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 17/082,210

(22) Filed: Oct. 28, 2020

(65) Prior Publication Data

US 2022/0130294 A1 Apr. 28, 2022

(51) Int. Cl.
| | | |
|---|---|---|
| *G09F 21/04* | (2006.01) | |
| *G06V 20/58* | (2022.01) | |
| *G06V 20/62* | (2022.01) | |
| *G09F 7/18* | (2006.01) | |

(52) U.S. Cl.
CPC ............ *G09F 21/048* (2013.01); *G06V 20/58* (2022.01); *G06V 20/62* (2022.01); *G09F 2007/1865* (2013.01)

(58) Field of Classification Search
CPC .......... G09F 21/048; G09F 2007/1865; G06V 20/58; G06V 20/62
See application file for complete search history.

(56) References Cited

U.S. PATENT DOCUMENTS

| | | | |
|---|---|---|---|
| 7,312,713 B2 | 12/2007 | Alfano et al. | |
| 7,965,336 B2 | 6/2011 | Bingle et al. | |
| 10,796,354 B1* | 10/2020 | Termeer | G06Q 30/0635 |
| 2003/0089012 A1* | 5/2003 | Smith | G09F 21/048 |
| | | | 40/590 |
| 2004/0035033 A1* | 2/2004 | Craig | G09F 21/048 |
| | | | 40/591 |

(Continued)

OTHER PUBLICATIONS

Gregory J. Hoover, "Aircraft Ice Detectors and Related Technologies for Onground and Inflight Applications", FAA Technical Center, Atlantic City International Airport, NJ, Apr. 1993, 54 pages.

*Primary Examiner* — Gary C Hoge
(74) *Attorney, Agent, or Firm* — Brandon Hicks; Eversheds Sutherland (US) LLP

(57) ABSTRACT

Systems and methods for exterior signage evaluation are disclosed herein. An example method includes receiving images of an exterior signage area of an exterior surface of a first vehicle, the images being obtained by the first vehicle, a second vehicle camera or an infrastructure camera, determining current environmental conditions around the first vehicle, processing the images of the exterior signage area using the current environmental conditions, wherein processing includes comparing an expected appearance of the exterior signage area with an actual appearance of the exterior signage area to determine a visual appearance quality of the exterior signage area, and presenting a message on a display that includes the visual appearance quality.

13 Claims, 6 Drawing Sheets

(56) References Cited

U.S. PATENT DOCUMENTS

| | | | | |
|---|---|---|---|---|
| 2006/0143957 | A1* | 7/2006 | Salehi | G09F 21/048 |
| | | | | 40/590 |
| 2008/0257033 | A1 | 10/2008 | Roberts | |
| 2009/0211132 | A1* | 8/2009 | Rosa | G09F 21/04 |
| | | | | 40/606.01 |
| 2012/0303458 | A1* | 11/2012 | Schuler, Jr. | G06Q 30/0266 |
| | | | | 705/14.62 |
| 2014/0247352 | A1* | 9/2014 | Rathi | G06V 20/588 |
| | | | | 348/148 |
| 2021/0150902 | A1* | 5/2021 | Okubi | B60W 30/0956 |
| 2021/0334540 | A1* | 10/2021 | Zhang | G06V 20/62 |
| 2022/0051391 | A1* | 2/2022 | Bogomolny | G01N 21/952 |

* cited by examiner

SYSTEMS AND METHODS FOR DETERMINING A VISUAL APPEARANCE QUALITY OF AN EXTERIOR SIGNAGE AREA OF A VEHICLE

BACKGROUND

Vehicles can include exterior signage such as graphics, text, images, and the like. One example includes emergency response vehicles. Exterior signage can be placed on any vehicle. For exterior signage content to have the best opportunity to be seen clearly, the exterior vehicle surfaces and signage should be clean. Vehicle exteriors can be deleteriously affected by, for example, road debris, mud, insect residue, water, dirt, dust, salt, and so forth. Furthermore, the visibility of exterior signage can be affected by environmental conditions, such as rain, fog, and varying light conditions. Thus, the visibility of exterior signage can be negatively affected not only by contaminants but also by environmental conditions.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to systems and methods that can determine a visual appearance quality of an exterior signage area of a vehicle. For example, when a vehicle has exterior signage, the visual appearance quality can be degraded by both contaminants and environmental conditions.

The exterior signage can be obscured due to contaminants, such as road grime, salt, graffiti, markings, and so forth. Images captured of the exterior signage area and/or external surface of the vehicle can be evaluated to determine the quality of the visual appearance of the vehicle. That is, the systems and methods herein can determine if the exterior signage area is adequately visible.

A vehicle can request another adjacent vehicle to obtain images of its exterior signage area. In some instances, images can be obtained by the adjacent vehicle illuminating the exterior signage area or the external surface of a vehicle with light from a vehicle. A vehicle can request images from a local infrastructure device or system, such as a camera mounted on a building, a streetlight, toll plaza, or a parking garage—just to name a few.

Images of the vehicle can not only be obtained from a second vehicle, an infrastructure camera but even from the subject vehicle itself. These captured images can be evaluated by comparison with baseline or expected images to determine a visual appearance quality of the exterior signage area. In some instances, the images of a vehicle can be obtained by request from a service provider. The service provider can also be adapted to determine a visual appearance quality of the exterior signage area. In addition to evaluating images, some visual appearance quality determinations can involve the use of sensor data, as well as environmental conditions.

Illustrative Embodiments

Figure 1A:
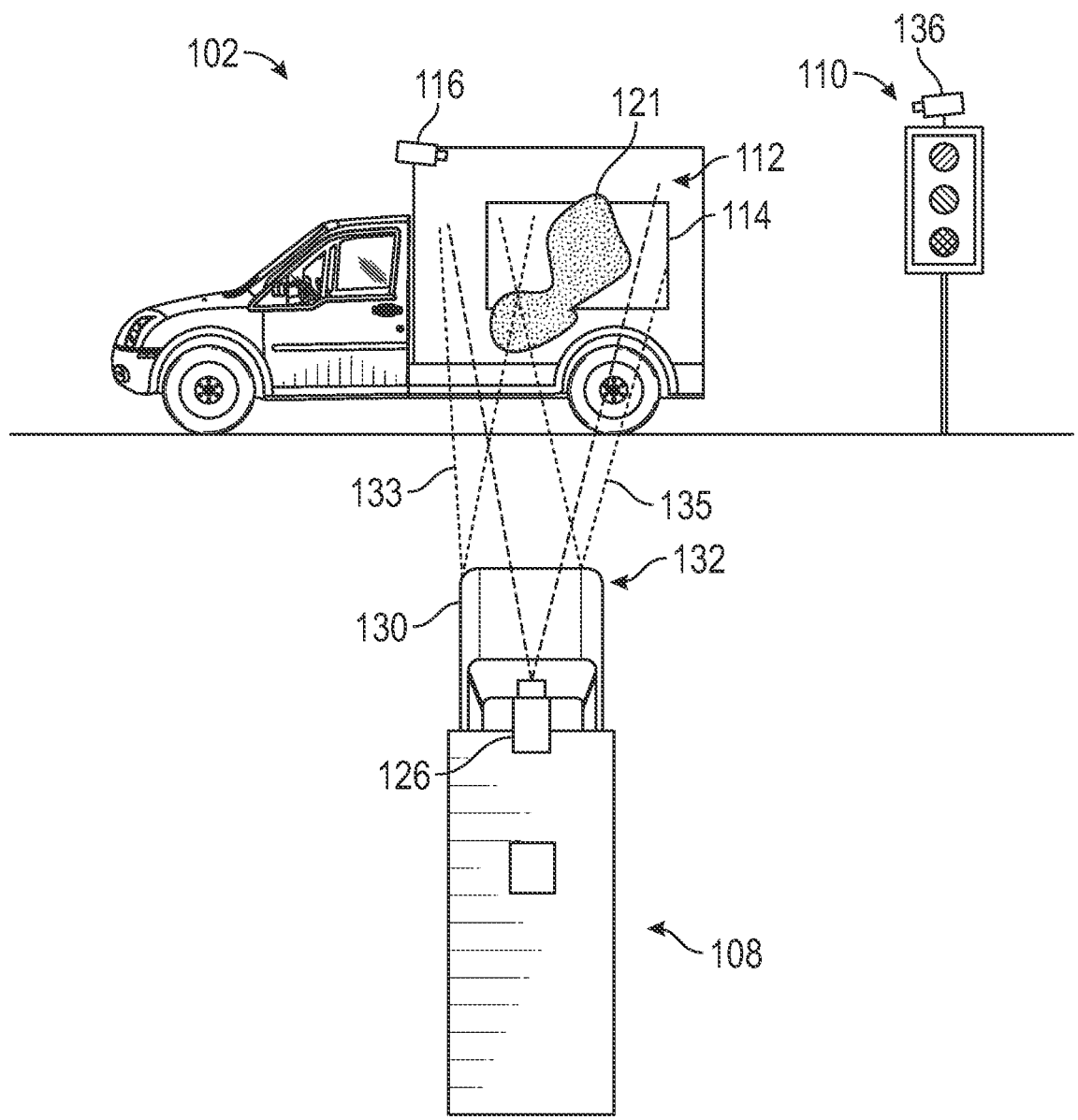
FIG. 1A depicts an illustrative architecture in which techniques and structures disclosed herein may be implemented.
Figure 1B:
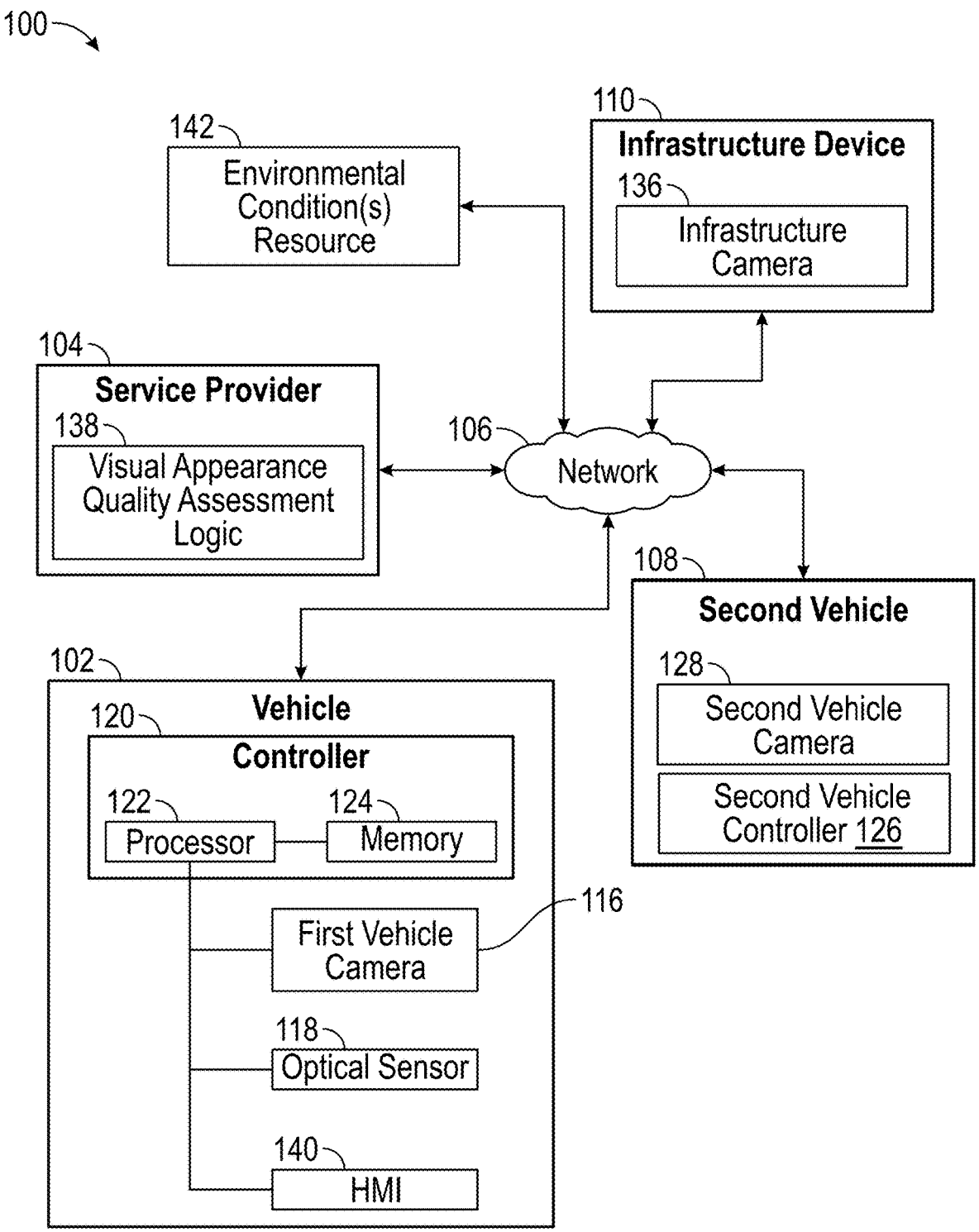
FIG. 1B schematically depicts aspects of the illustrative architecture of FIG. 1A.

Turning now to the drawings, FIG. 1A depicts an illustrative architecture 100 in which techniques and structures of the present disclosure may be implemented. FIG. 1B schematically depicts aspects of FIG. 1A. FIGS. 1A and 1B are discussed collectively below. The architecture 100 can comprise a first vehicle 102, a service provider 104, and a network 106. The architecture 100 can also include a second vehicle 108 and an infrastructure device 110. Each of these objects can be communicatively coupled with the network 106. In general, the network 106 includes any private and/or public network that can include short or long-range wireless networks. Each of the components of FIGS. 1A and 1B can be configured to access the network using devices or protocols that may depend on the network type utilized. Any of the vehicles disclosed herein can include autonomously operated vehicles. In general, the first vehicle 102 and the second vehicle 108 can communicate over the network 106 using any suitable vehicle-to-vehicle (V2V) communications. The first vehicle 102 and the infrastructure device 110 can communicate over the network 106 using any suitable vehicle-to-infrastructure (V2I or V2X) communications.

The first vehicle 102 can include an exterior surface 112 that comprises an exterior signage area 114. While a side panel of the first vehicle 102 is disclosed as an example exterior surface, any other surface of the first vehicle 102 can include an exterior signage area. Also, the first vehicle 102 can comprise a first vehicle camera 116 (or a plurality of first vehicle cameras). Generally, the first vehicle camera 116 can obtain images of the exterior surface 112.

The first vehicle 102 can comprise an optical sensor 118 as well. The optical sensor 118 could be any type of sensor that can sense the presence of contaminants on the exterior surface 112 of the first vehicle 102.

The vehicle 102 can include a controller 120 that can be configured to perform visibility determination methods for any portion of the exterior signage area as disclosed herein. The controller 120 can include a processor 122 and memory 124. The processor 122 executes logic stored in the memory 124. Some general operations of the controller 120 can include obtaining and/or processing images of the exterior surface 112 and/or the exterior signage area 114, specifically.

The controller 120 can be configured to obtain images of the exterior surface 112 and/or the exterior signage area 114 and transmit the same to the service provider 104. The controller 120 can be configured to request an exterior signage visibility determination from another vehicle, such as the second vehicle 108, or the service provider 104. In some instances, images of the exterior surface 112 and/or the exterior signage area 114 can be obtained from the infrastructure device 110 and/or the second vehicle 108.

Generally, exterior signage visibility determination methods (e.g., visual appearance quality assessments) disclosed herein can be performed by the first vehicle 102 using images obtained by the first vehicle 102, the second vehicle 108, the infrastructure device 110, or combinations thereof. The exterior signage visibility determination methods can be performed at the service provider level from images obtained from any vehicle, device, or system disclosed herein.

In more detail, the controller 120 can be configured to obtain images of the exterior surface 112 and/or the exterior signage area 114 using the first vehicle camera 116. Once images are obtained, the controller 120 can process the images to determine a visual appearance quality. The controller 120 can compare an expected appearance of the exterior signage area with an actual appearance of the exterior signage area to determine a visual appearance quality of the exterior signage area. For example, a baseline or expected image of the exterior surface 112 and/or the exterior signage area 114 can be used as a control. Levels of various visual aspects such as contrast, brightness, color, and so forth can be established for the expected or baseline image. When images of the exterior surface 112 and/or the exterior signage area 114 are subsequently captured, these actual images can be compared with the baseline images on a pixel-by-pixel basis (or other similar comparison) to determine deviations between the baseline or expected image(s) and the captured images of the exterior surface 112 and/or the exterior signage area 114. When the actual images have a predetermined deviation compared with the baseline or expected images, the controller 120 can determine that the exterior surface 112 and/or the exterior signage area 114 has a poor visual appearance quality. Generally, the controller 120 can determine if the exterior surface 112 and/or the exterior signage area 114 have an adequate visual appearance, if the visual appearance is uncertain, or the visual appearance is poor. The controller 120 can assign one of these categories based on the measured deviation(s) in one or more visual aspects such as contrast, brightness, color, reflectivity, and so forth.

In some instances, the deviations may be quantified based on magnitude. In one example, when a contrast level difference for the exterior signage area 114 is less than 15%, comparing baseline or expected image(s) and the captured images, the visual appearance quality can be selected as adequate or acceptable. When a contrast level difference for the exterior signage area 114 is between 15% and 40%, comparing baseline or expected image(s) and the captured images, the visual appearance quality can be selected as unclear. When a contrast level difference for the exterior signage area 114 is above 40%, comparing baseline or expected image(s) and the captured images, the visual appearance quality can be selected as poor. It will be appreciated that these are merely example ranges and percentages that can be used. Moreover, the selection of contrast level is provided only for example purposes and is not intended to be limiting.

As noted above, a decline in visual appearance quality for the exterior signage area 114 may occur due to a variety of factors. By way of example, an area of contaminants 121, such as mud and grime may be present over a portion of the exterior surface 112 and a portion of the exterior signage area 114, which may cause a decline in visual appearance quality for the exterior signage area 114. For example, the area of contaminants 121 may obscure indicia of the exterior signage area 114.

While some examples involve the evaluation of visual appearance quality of the exterior signage area 114, the controller 120 could also be configured to evaluate the visual appearance quality of the exterior surface 112 in general and impute the visual appearance of the exterior surface 112 in general to the exterior signage area 114. As noted above, the visual appearance of a surface can be affected when a surface is obscured from contaminants, such as water, dirt, grime, salt, sand, and so forth.

When the visual appearance quality of the exterior signage area does not meet or exceed a visual appearance quality threshold (e.g., the visual appearance quality is unclear or poor), a message could be displayed on a human-machine interface (HMI 140) that indicates to a driver to clean the vehicle. When the first vehicle 102 is an autonomous vehicle, the controller 120 could direct the first vehicle 102 to a maintenance facility or car wash for cleaning. In general, the controller 120 can present a message to a recipient that includes the visual appearance quality. The recipient could include a driver of the vehicle or a control system of the vehicle when the first vehicle 102 is autonomous.

As noted above, the controller 120 can be configured to transmit a message to the second vehicle 108 to obtain images of the exterior surface 112 and/or the exterior signage area 114 of the second vehicle 108. The controller 120 can be configured to broadcast the message to vehicles that are in proximity to the first vehicle 102 over a V2V communications channel. Alternatively, the controller 120 can include its location in the message and also determine locations of vehicles near the first vehicle 102, such as the second vehicle 108. The message could specify that images should be obtained from a specific surface of the first vehicle 102. Alternatively, images could be obtained of all of the surfaces of the first vehicle 102.

By way of example, the second vehicle 108 may receive the message and location of the first vehicle. The second vehicle 108 includes a second vehicle controller 126 that can include a processor and memory, similar to those described above with respect to controller 120 of the first vehicle 102. Generally, the second vehicle controller 126 can receive the message from the controller 120 of the first vehicle 102 and navigate to the location of the first vehicle 102. The second vehicle controller 126 can obtain images of the exterior surface 112 and/or the exterior signage area 114 of the first vehicle 102 using a second vehicle camera 128.

The second vehicle 108 can include headlights 130 and 132 that can emit light in areas 133 and 135. These headlights 130 and 132 emit light towards the exterior surface 112 and/or the exterior signage area 114 of the first vehicle 102. Once illuminated, the second vehicle controller 126 can obtain images of the exterior surface 112 and/or the exterior signage area 114 of the first vehicle 102. The second vehicle controller 126 can cause the headlights 130 and 132 to operate at both a high-output level and a low-output level, with images being obtained by the second vehicle camera 128.

Regardless of how the images are obtained, the second vehicle controller 126 can forward the images to the controller 120 of the first vehicle 102 for processing. Alternatively, the second vehicle camera 128 can forward the images to the service provider 104 for processing.

As noted above, while images of the first vehicle 102 can be obtained from the second vehicle 108, the images can be obtained from an infrastructure device 110. The infrastructure device 110 can include a streetlight associated with an infrastructure camera 136. The infrastructure camera 136 can be activated to obtain images of the first vehicle 102 based on a message received from the first vehicle 102 or from the service provider 104.

The controller 120 of the first vehicle 102 can transmit a request to determine the visual appearance quality of the exterior signage area to the service provider 104. The service provider 104 can be configured with visual appearance quality assessment logic 138. The visual appearance quality assessment logic 138 can be used to process images of vehicles as disclosed herein. Further, some specific aspects of the visual appearance quality assessment logic 138 implemented by the service provider are described with reference to the flow diagram of FIG. 5.

Additionally, the controller 120 can be configured to determine current environmental conditions around the first vehicle 102. The controller 120 could obtain current environmental conditions from an environmental condition(s) resource 142, such as a weather service or other third-party information source. Environmental conditions could also be determined from on-board sensors of the first vehicle 102, such as the optical sensor 118 or a weather feature provided through the HMI 140. Generally, the current environmental conditions could provide information that is indicative of current light levels (e.g., Sun position), rain, snow, or other weather that might reduce the visual appearance quality of the exterior signage area 114 of the first vehicle 102.

As noted above, in some situations, the visual appearance quality may be determined as unclear or indeterminate. In these situations, the controller 120 can be configured to infer the visual appearance quality from vehicle operational data. The controller 120 can collect vehicle operational data for the first vehicle and determine an inferred visual appearance quality of the exterior signage area based on the vehicle operational data. In some instances, the inferred visual appearance quality is used to verify the visual appearance quality or is used in place of the visual appearance quality when the comparison is inconclusive. These methods can also be used to confirm or verify visual appearance quality determinations as well.

The controller 120 can implement algorithms based on known data and metrics to determine if the vehicle's exterior signage content and display performance are likely to be degraded. For example, the controller 120 can utilize current environmental information such as whether it just rained or snowed, whether roads are currently wet, an elapsed time of vehicle operation, and so forth.

A database of information can be created that is based on actual vehicle test results under controlled, known conditions. These data can be used to determine if a vehicle's exterior surfaces are likely to be degraded under a wide variety of vehicle operating conditions. For example, if it is currently raining at a rate of an inch per hour, and the vehicle is traveling at a speed of sixty-five miles per hour, the controller 120 can estimate that the vehicle's exterior surfaces will become dirty. Furthermore, certain roads could be tagged as less likely or more likely to cause dirt, mud, and so forth to accumulate or be transmitted through the air via tire spray from other vehicles (or the target vehicle itself).

Due to vehicle location and vehicle geometry, the controller 120 could also estimate that some exterior signage locations may get dirtier at a faster rate than other locations. Factors leveraged in the algorithm used by the controller 120 can include but are not limited to rainfall/snowfall rate, vehicle speed, vehicle body and exterior signage (three-dimensional and computational fluid dynamics modeling), elapsed time, traffic density (and number of surrounding vehicles), distance from surrounding vehicles, likelihood of traversed roads being salted, current road moisture (dry, wet, etc.), current road surface finish (smooth, rough, etc.), and any combinations and/or permutations thereof.

Figure 2:
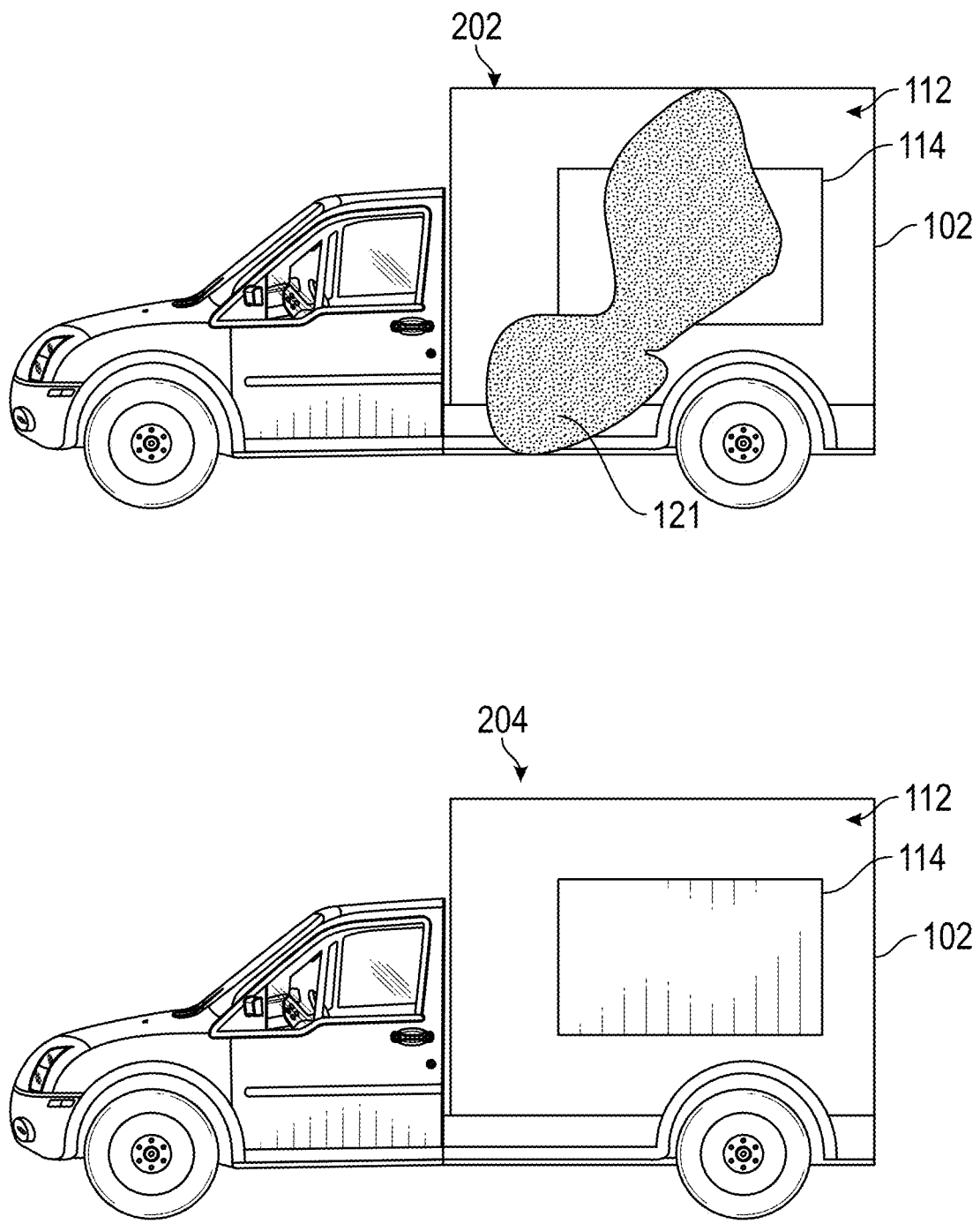
FIG. 2 depicts two views of a vehicle, a first with a poor visual appearance quality of an exterior signage area, and a second with a good or acceptable visual appearance quality of an exterior signage area.

FIG. 2 illustrates a comparison between the first vehicle 102 in a contaminated state 202 and a clean state 204. In general, in the contaminated state 202, the area of contaminants 121, such as mud and grime are present over a portion of the exterior surface 112 and a portion of the exterior signage area 114. The clean state 204 exists when all, or substantially all, of the exterior surface 112 and the exterior signage area 114 are free from contaminants. In the clean state 204, indicia present in the exterior signage area 114 can be visually determined, whereas in the contaminated state 202, the contaminants 121 obscure, at least partially, the exterior signage area 114.

Figure 3:
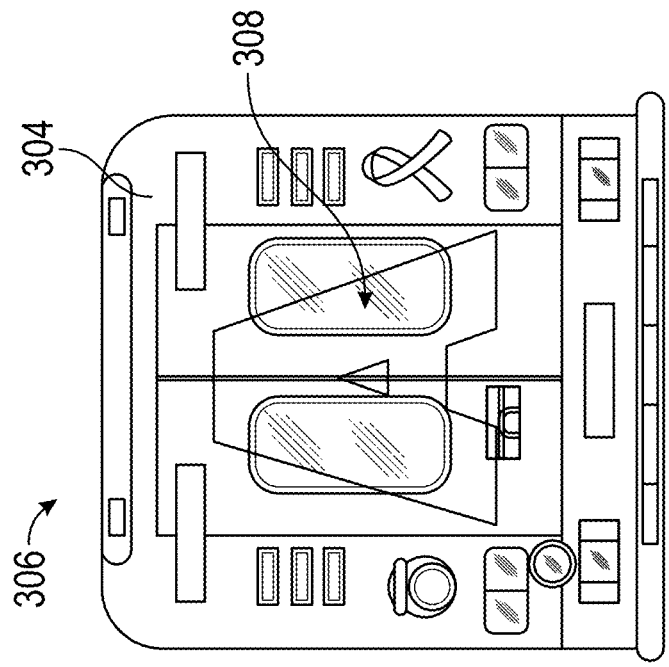
FIG. 3 also depicts two images of a vehicle, a first with a poor visual appearance quality of an exterior signage area, and a second with a good or acceptable visual appearance quality of an exterior signage area.
Figure 3:
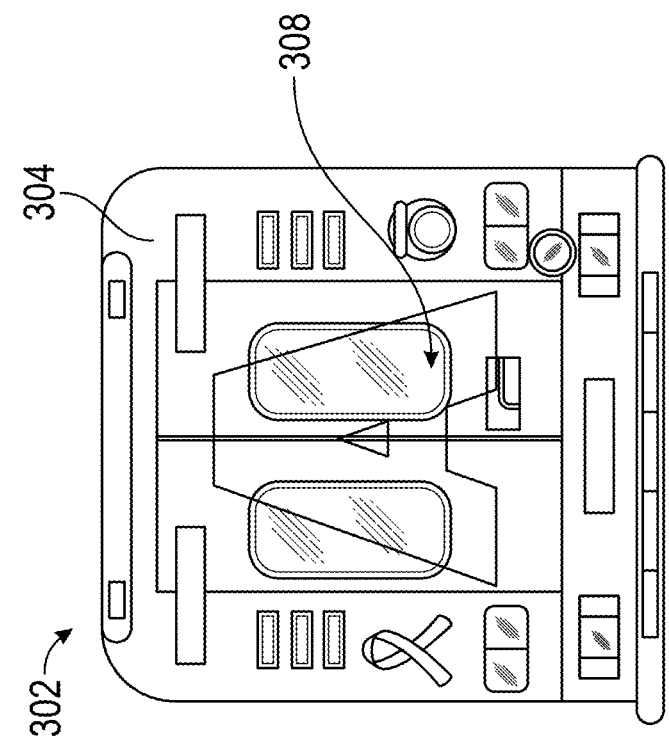

FIG. 3 illustrates an example comparison between a first image 302 of a vehicle 304 and a second image 306 of the vehicle 304. In the first image 302, reflective indicia 308 is at least partially obscured. Conversely, in the second image 306, the reflective indicia 308 is visible.

Figure 4:
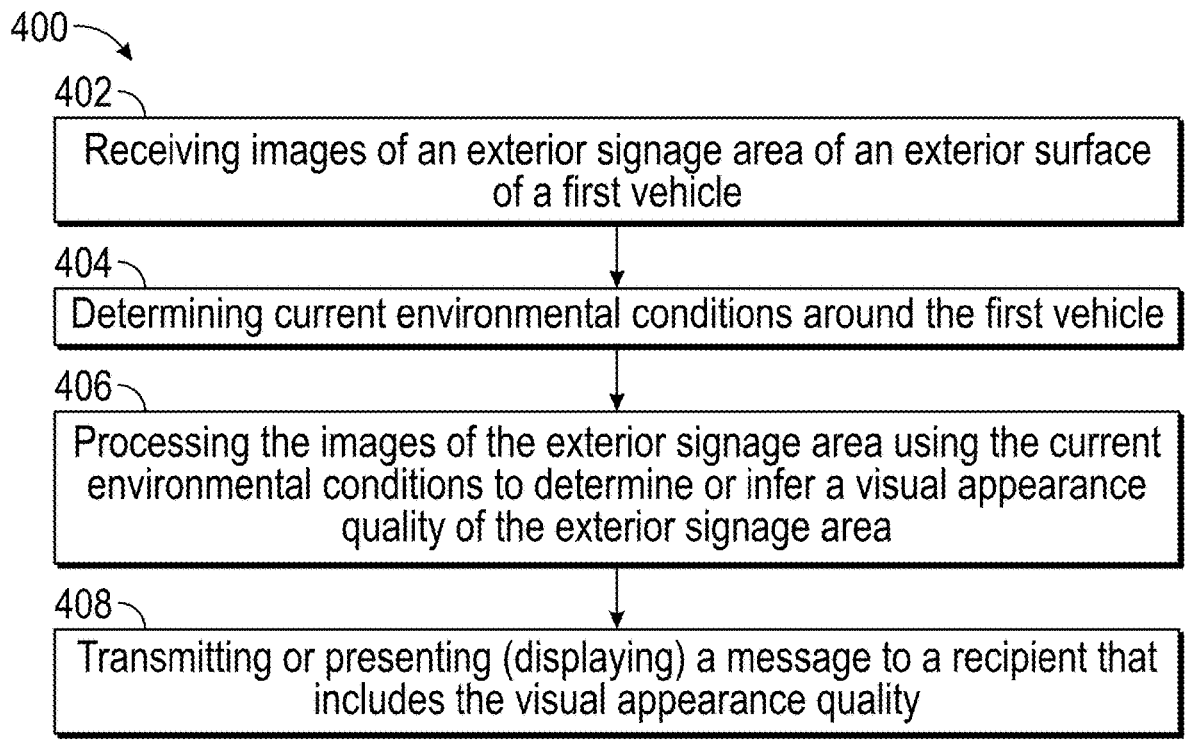
FIG. 4 is a flowchart of an example method of the present disclosure.

FIG. 4 is a flowchart of an example method of the present disclosure. The method can include a step 402 of receiving images of an exterior signage area of an exterior surface of a first vehicle. As noted above, the images can be obtained by a second vehicle camera or an infrastructure camera. The images can also be obtained by a camera of the first vehicle. In addition to image data, sensor data can be obtained as well.

The method includes a step 404 of determining current environmental conditions around the first vehicle. For example, the current environmental conditions could be obtained from sensors onboard the vehicle itself, from other adjacent vehicles, or a third-party resource.

The method includes a step 406 of processing the images of the exterior signage area using the current environmental conditions. Processing can include comparing an expected appearance of the exterior signage area with an actual appearance of the exterior signage area to determine a visual appearance quality of the exterior signage area. As noted above, the visual appearance quality can be assessed as acceptable, as poor, or indeterminate/unclear.

Once the visual appearance quality is determined, the method can include a step 408 of transmitting or presenting (displaying) a message to a recipient that includes the visual appearance quality. This message could include an indication that the vehicle requires cleaning to improve the visual appearance quality of the exterior signage area of the vehicle.

Again, at least a portion of the images can be obtained from a camera or a sensor of the first vehicle. A second vehicle camera of a second vehicle can obtain at least a portion of the images by initially illuminating the exterior signage area with an external vehicle light of the second vehicle. In some instances, the external vehicle light can be operated at a high-output level and a low-output level, and images can be obtained at both these output levels.

The method may also include transmitting a request to a service provider by the first vehicle to determine the visual appearance quality of the exterior signage area. This step may occur before step 402 in some instances.

When a request is transmitted to another vehicle, the method can include determining the proximity of the second vehicle to the first vehicle, or the presence of the first vehicle near the infrastructure camera. Thus, the vehicle can select whichever camera is nearest to the vehicle's current location to obtain images of the vehicle's exterior signage area.

As noted above, if the visual appearance quality of the exterior signage area is unclear, the method can include collecting vehicle operational data for the first vehicle and determining an inferred visual appearance quality of the exterior signage area based on the vehicle operational data. For example, it can be inferred that the visual appearance quality of the exterior signage area is poor if it has been several weeks since the vehicle has been washed or since it has rained. It can be inferred that the visual appearance quality of the exterior signage area is poor if the vehicle has been operating in heavy traffic or in light rain, which may cause mud to build on the external surfaces of the vehicle.

Figure 5:
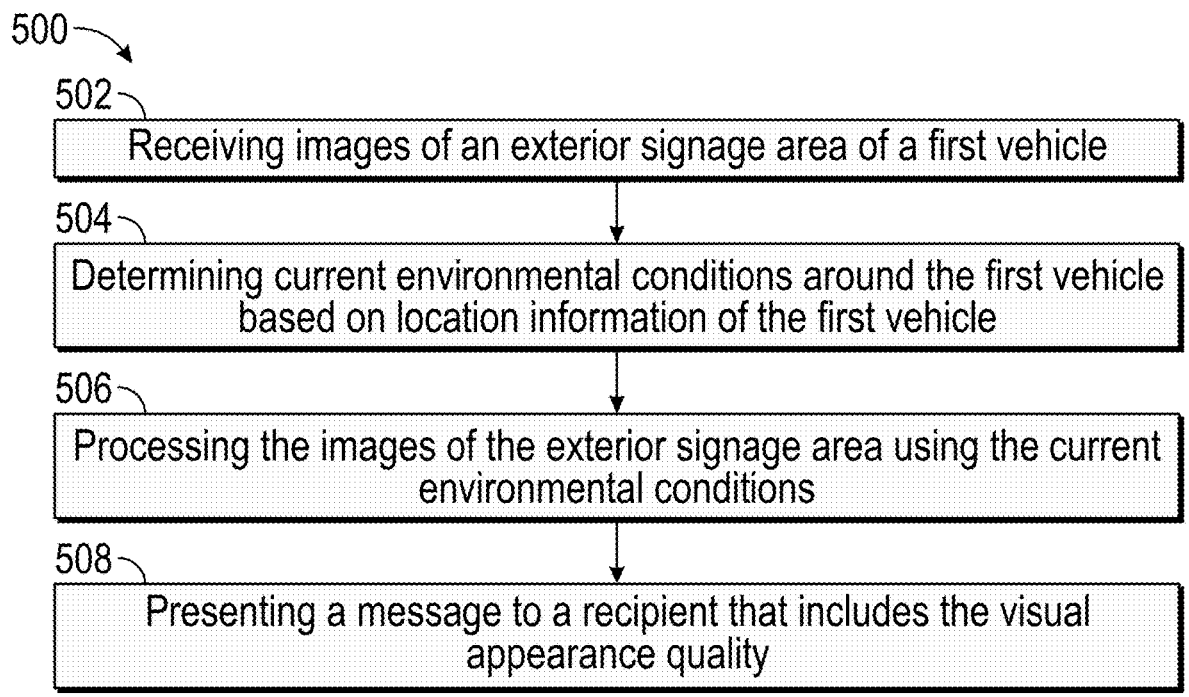
FIG. 5 is a flowchart of an example method of the present disclosure.

FIG. 5 is a flowchart of an example method performed by a service provider. For context, a first vehicle could comprise an exterior signage area of an exterior surface. At some point, a determination can be made as to the visual appearance quality of the exterior signage area. The first vehicle could include an autonomous vehicle that is engaged in ride-hailing services that are mediated through the service provider. In another example, the first vehicle could include an emergency response vehicle and the service provider is a dispatch service.

The service provider is communicatively coupled with the first vehicle over a network. The method can include a step 502 of receiving images of the exterior signage area. As noted above, the images can be obtained by any of the first vehicle, a second vehicle camera or an infrastructure camera, as directed by the service provider (or potentially cooperatively requested by the first vehicle). The method can include a step 504 of determining current environmental conditions around the first vehicle based on location information obtained from the first vehicle. This can include determining ambient light levels or weather conditions, for example.

The method can include a step 506 of processing the images of the exterior signage area using the current environmental conditions. In some instances, processing includes comparing an expected appearance of the exterior signage area with an actual appearance of the exterior signage area to determine a visual appearance quality of the exterior signage area. Again, the current environmental conditions can be used to influence the comparison. In an example, when light levels are low, few contaminants present on the exterior signage area may result in poor visual appearance quality as compared when light levels are greater. Finally, the method can include a step 508 of presenting a message to a recipient that includes the visual appearance quality. The message could be displayed on a human-machine interface of the first vehicle.

In some examples, a service provider can be configured to transmit a request to a second vehicle having the second vehicle camera, to obtain the images of the exterior signage area. In some instances, the request includes instructions to obtain a portion of the images when the second vehicle illuminates the exterior signage area with high-output level light and another portion of the images when the second vehicle illuminates the exterior signage area with a low-output level light.

The service provider can be configured to determine proximity of the second vehicle to the first vehicle or the presence of the first vehicle near the infrastructure camera. For example, the service provider can obtain GPS or other location/position information from the first vehicle.

When images cannot be obtained of the first vehicle and/or when the visual appearance quality of the exterior signage area is unclear or inconclusive, the service provider can be configured to collect vehicle operational data for the first vehicle. In some instances, the service provider can collect, store, and model vehicle operational data for the first vehicle over a period of time across various driving conditions. Once modeled, the service provider can apply the modeling to determine an inferred visual appearance quality of the exterior signage area based on the vehicle operational data. It will be appreciated that the inferred visual appearance quality can also be used to verify the visual appearance quality or is used in place of the visual appearance quality when the comparison is inconclusive.

Figure 6:
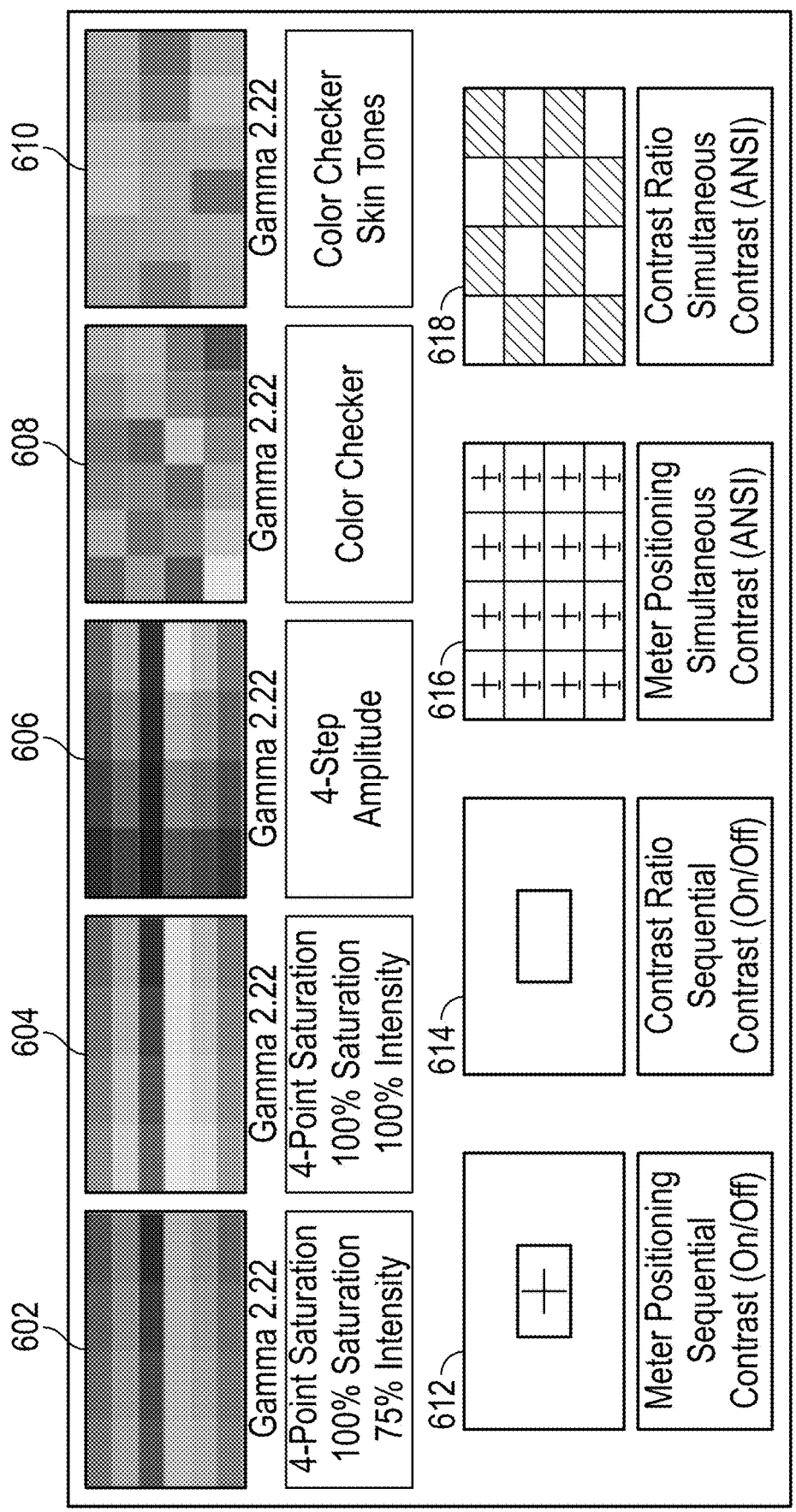
FIG. 6 illustrates example patterns that can be displayed on an external display of a vehicle.

Referring to FIGS. 1 and 6 collectively, the exterior signage area 114 can include a digital display. Thus, content displayed on the exterior signage area 114 can vary as desired. The digital display that provides content in the exterior signage area 114 can be operated through use of the controller 120. The controller 120 can cause the digital display to present various control images or patterns that can be used to determine a contaminated state for the digital display. Example patterns include a first pattern 602 that includes four point saturation, 100% saturation, and 75% intensity. A second pattern 604 can include four point saturation, 100% saturation, and 100% intensity. A third pattern 606 can include a four step amplitude pattern. A fourth pattern 608 can include a color checker pattern having a plurality of checkers, each with a unique hue. A skin tone pattern 610 is also illustrated. The digital display can provide a meter positioning with sequential contrast pattern 612, a contrast ratio pattern 614, a meter positioning pattern 616, and a checkerboard contrast ratio pattern 618. It will be appreciated that these are merely example patterns that can be used and are not intended to be limiting.

Generally, the controller 120 can be configured present an image of any of these patterns to help assess the signage performance. The controller 120 can trigger display of a test pattern via the request from a service provider, as an example. As with the embodiments above, a second vehicle can be used to analyze and take data of the target vehicle and submit the results via the network to the service provider 104.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can,"

"could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
receiving an image of an exterior signage area of an exterior surface of a first vehicle, the image being obtained by a camera;
determining current environmental conditions around the first vehicle;
processing the image of the exterior signage area based on the current environmental conditions, wherein processing includes comparing an expected appearance of the exterior signage area with an actual appearance of the exterior signage area to determine a visual appearance quality of the exterior signage area; and
transmitting a message that includes the visual appearance quality.

2. The method according to claim 1, wherein the camera is associated with the first vehicle.

3. The method according to claim 1, wherein the camera obtains the image when the exterior signage area is illuminated with an external vehicle light of a second vehicle.

4. The method according to claim 3, wherein the image is obtained when the external vehicle light is operated at a high-output level and a low-output level.

5. The method according to claim 1, further comprising transmitting a request to a service provider by the first vehicle to determine the visual appearance quality of the exterior signage area.

6. The method according to claim 1, further comprising determining a proximity of the camera to the first vehicle.

7. The method according to claim 1, further comprising:
collecting vehicle operational data for the first vehicle; and
determining an inferred visual appearance quality of the exterior signage area based on the vehicle operational data.

8. The method according to claim 7, wherein the inferred visual appearance quality is used to verify the visual appearance quality or is used in place of the visual appearance quality when a comparison is inconclusive.

9. A system, comprising:
a first vehicle comprising an exterior signage area of an exterior surface; and
a service provider that is communicatively coupled with the first vehicle over a network, wherein the service provider is configured to:
receive images of the exterior signage area, the images being obtained by any of the first vehicle, a second vehicle camera, or an infrastructure camera;
determine current environmental conditions around the first vehicle based on location information obtained from the first vehicle;
process the images of the exterior signage area using the current environmental conditions, wherein processing includes comparing an expected appearance of the exterior signage area with an actual appearance of the exterior signage area to determine a visual appearance quality of the exterior signage area; and
transmit a message to a recipient that includes the visual appearance quality.

10. The system according to claim 9, wherein the service provider is configured to transmit a request to a second vehicle having the second vehicle camera to obtain the images of the exterior signage area.

11. The system according to claim 10, wherein the request includes instructions to obtain a portion of the images when the second vehicle illuminates the exterior signage area with high-output level light and another portion of the images when the second vehicle illuminates the exterior signage area with a low-output level light.

12. The system according to claim 10, wherein the service provider is configured to determine proximity of the second vehicle camera or the infrastructure camera to the first vehicle.

13. The system according to claim 10, wherein the service provider is configured to:
collect vehicle operational data for the first vehicle; and
determine an inferred visual appearance quality of the exterior signage area based on the vehicle operational data, wherein the inferred visual appearance quality is used to verify the visual appearance quality or is used in place of the visual appearance quality when comparison is inconclusive.

* * * * *